(12) United States Patent
Kirihara

(10) Patent No.: US 12,348,473 B2
(45) Date of Patent: Jul. 1, 2025

(54) NON-TRANSITORY COMPUTER READABLE MEDIUM, INFORMATION PROCESSING APPARATUS, AND INFORMATION PROCESSING METHOD FOR SAVING OR FORWARDING EXTRACTED MESSAGE

(71) Applicant: FUJIFILM Business Innovation Corp., Tokyo (JP)

(72) Inventor: Kazuko Kirihara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 606 days.

(21) Appl. No.: 17/580,715

(22) Filed: Jan. 21, 2022

(65) Prior Publication Data

US 2023/0094671 A1 Mar. 30, 2023

(30) Foreign Application Priority Data

Sep. 24, 2021 (JP) ................................. 2021-156074

(51) Int. Cl.
*H04L 51/214* (2022.01)
*H04L 12/18* (2006.01)
*H04L 51/043* (2022.01)
*H04L 51/52* (2022.01)

(52) U.S. Cl.
CPC ........ *H04L 51/214* (2022.05); *H04L 12/1831* (2013.01); *H04L 51/043* (2013.01); *H04L 51/52* (2022.05)

(58) Field of Classification Search
CPC . H04L 51/214; H04L 12/1831; H04L 51/043; H04L 51/52; H04L 51/046
See application file for complete search history.

(56) References Cited

U.S. PATENT DOCUMENTS

| | | | | |
|---|---|---|---|---|
| 9,461,947 B1* | 10/2016 | Lan | ........................ | H04L 67/535 |
| 11,588,913 B1* | 2/2023 | Castro | ................... | H04L 51/212 |
| 2009/0216894 A1* | 8/2009 | Sagara | .................. | H04L 51/214 |
| | | | | 709/230 |
| 2014/0012927 A1* | 1/2014 | Gertzfield | ............. | G06F 16/287 |
| | | | | 709/206 |
| 2016/0021038 A1* | 1/2016 | Woo | ...................... | H04L 51/212 |
| | | | | 709/206 |
| 2016/0050157 A1* | 2/2016 | Abbott | .................. | H04L 47/365 |
| | | | | 709/223 |

(Continued)

FOREIGN PATENT DOCUMENTS

| | | |
|---|---|---|
| CN | 111371677 A | 7/2020 |
| CN | 112434328 A | 3/2021 |

(Continued)

OTHER PUBLICATIONS

May 13, 2025 Office Action issued in Japanese Patent Application No. 2021-156074.

*Primary Examiner* — Javier O Guzman
(74) *Attorney, Agent, or Firm* — Oliff PLC

(57) ABSTRACT

A non-transitory computer readable medium storing a program causing a computer to execute a process is provided, and the process includes extracting at least one message that satisfies a condition specified by a user from one or more messages in a chat room to which one or more users are allowed to write and saving the at least one extracted message or forwarding the at least one extracted message to another chat room.

20 Claims, 14 Drawing Sheets

(56) References Cited

U.S. PATENT DOCUMENTS

| | | | | |
|---|---|---|---|---|
| 2016/0135044 A1* | 5/2016 | Altuwaiyan | ............ | H04W 4/21 |
| | | | | 455/411 |
| 2016/0323220 A1* | 11/2016 | Emejulu | ............... | H04L 51/214 |
| 2017/0171121 A1* | 6/2017 | Zhang | ..................... | H04L 67/75 |
| 2019/0372923 A1 | 12/2019 | Pasternack | | |
| 2019/0386937 A1* | 12/2019 | Kim | ...................... | G06F 40/268 |
| 2020/0045006 A1* | 2/2020 | Yi | ........................... | H04L 51/42 |
| 2021/0314284 A1* | 10/2021 | Zhai | ....................... | G06F 40/30 |
| 2021/0409354 A1* | 12/2021 | Jang | ........................ | H04L 51/18 |
| 2023/0412535 A1* | 12/2023 | Wang | ..................... | H04L 51/10 |

FOREIGN PATENT DOCUMENTS

| | | |
|---|---|---|
| JP | 2008-83837 A | 4/2008 |
| JP | 5656254 B2 | 1/2015 |
| JP | 2016-035750 A | 3/2016 |

\* cited by examiner

FIG. 4

INPUT OF CONDITION

Range of messages to be saved

· Messages being presented
    · Specify time period during which message was sent Hour: Minute, MM/DD/YYYY
        to Hour: Minute, MM/DD/YYYY · Specify first and last messages
    · Messages exchanged with specified user Saving format · Data format
    · Image format Select information to be saved · Everything
    · Hide sender information · Hide everything
        · Present division name only

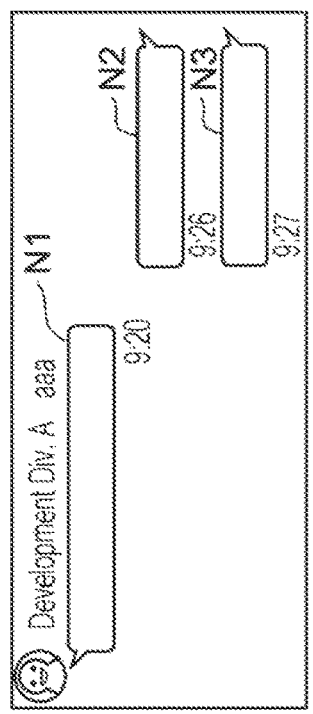
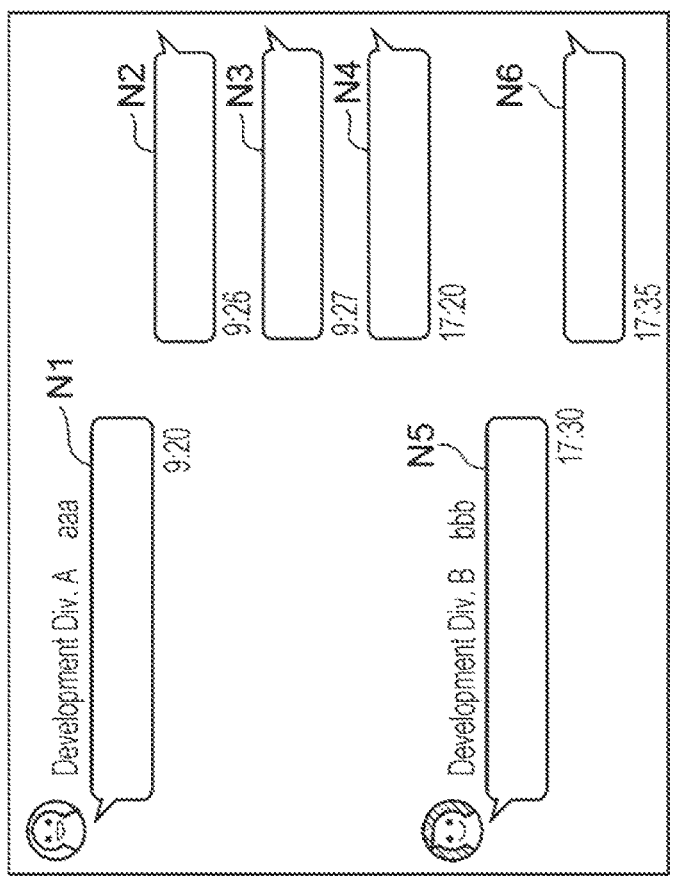
FIG. 8B
FIG. 8A

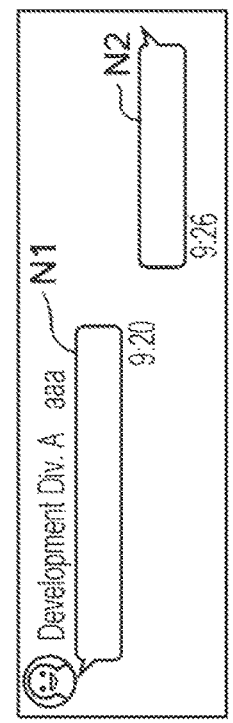
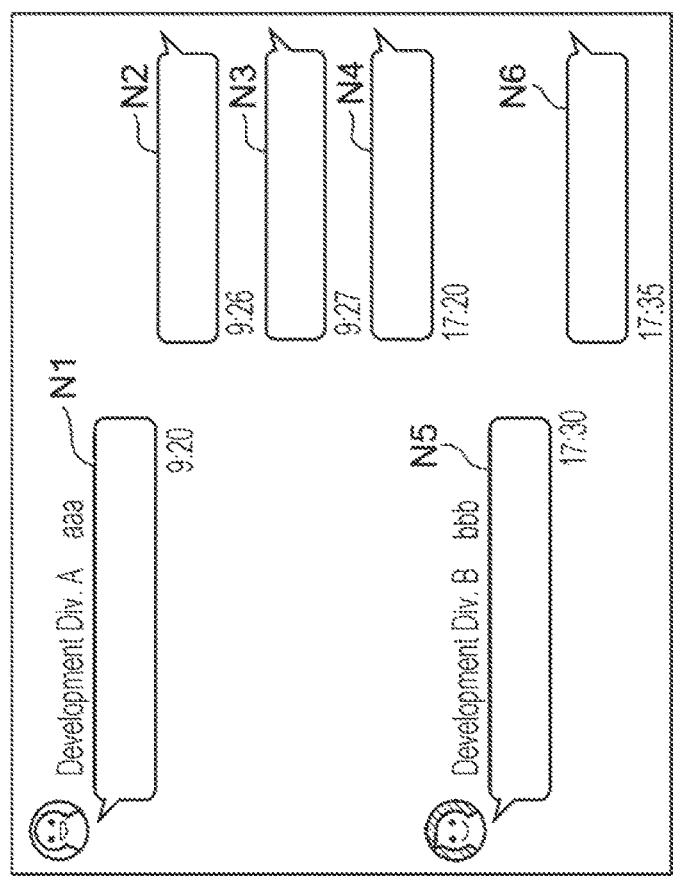
FIG. 9B
FIG. 9A

| MESSAGE ID | SENDER ID | DATE AND TIME OF SENDING | MESSAGE |
|---|---|---|---|
| 0001 | ID1 | 9:20 | xxx |
| 0002 | ID2 | 9:26 | yyyyy |
| 0003 | ID1 | 9:30 | zzzzzzzz |
| 0004 | ID2 | 9:33 | uuu |
| 0005 | ID3 | 9:40 | iiiiiiiiiiiiiiiiii |
| 0006 | ID2 | 9:42 | wwwww |

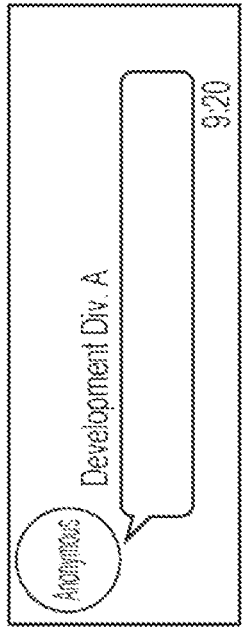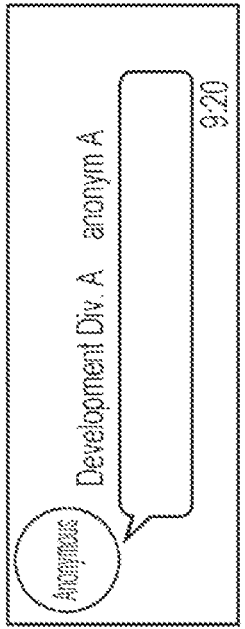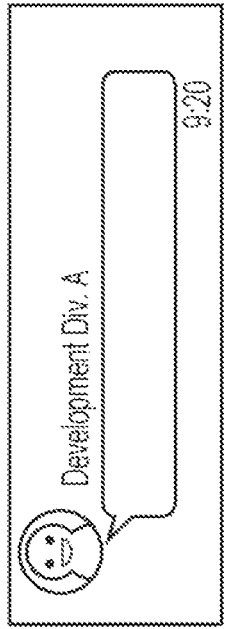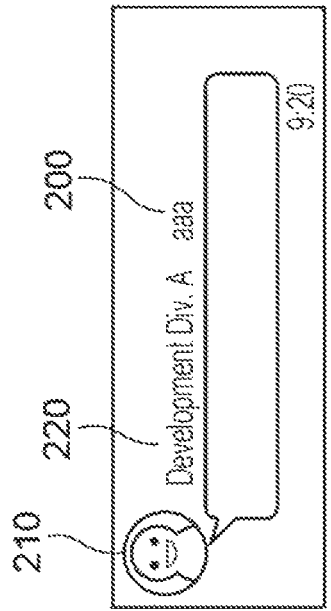

NON-TRANSITORY COMPUTER READABLE MEDIUM, INFORMATION PROCESSING APPARATUS, AND INFORMATION PROCESSING METHOD FOR SAVING OR FORWARDING EXTRACTED MESSAGE

CROSS-REFERENCE TO RELATED APPLICATIONS

This application is based on and claims priority under 35 USC 119 from Japanese Patent Application No. 2021-156074 filed Sep. 24, 2021.

BACKGROUND

(i) Technical Field

The present disclosure relates to a non-transitory computer readable medium, an information processing apparatus, and an information processing method.

(ii) Related Art

Japanese Patent No. 5656254 discloses a communication-event log creation system that includes an event-data acquiring unit and a storage unit. The event-data acquiring unit is configured to acquire event data including information regarding the sender, the recipient, and the transmission time of each message in a communication event caused by using multiple communication tools of different kinds, and the storage unit is configured to convert the event data acquired by the event-data acquiring unit into data in a certain data format and to save the data after the conversion. The event-data acquiring unit includes a unit configured to process the event data by including as a recipient of a specific message a sender of a message that is other than the specific message and that was sent during a predetermined time period before or after the time that the specific message was sent.

Japanese Unexamined Patent Application Publication No. 2008-083837 discloses a chat reporting system configured to enable a user to chat with another person in a virtual space by using characters and to report content in a chat when the user wants to report the content in the chat to a third party. The chat reporting system includes a recording unit configured to record a character-based chat with another person, a chat acquiring unit configured to acquire the chat recorded by the recording unit, an encrypting unit configured to encrypt the chat acquired by the chat acquiring unit, and an email sending unit configured to send an email containing the chat encrypted by the encrypting unit to a predetermined destination.

SUMMARY

When a message retained in a chat room is saved or forwarded, a screen shot may be used. However, when a screen shot is used to save or forward a message, all the messages displayed in a screen out of the messages retained in a chat room are collectively saved or forwarded.

Aspects of non-limiting embodiments of the present disclosure relate to providing a non-transitory computer readable medium, an information processing apparatus, and an information processing method capable of saving or forwarding a message that is retained in a chat room and that satisfies a condition specified by a user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing a program causing a computer to execute a process, the process including extracting at least one message that satisfies a condition specified by a user from one or more messages in a chat room to which one or more users are allowed to write and saving the at least one extracted message or forwarding the at least one extracted message to another chat room.

BRIEF DESCRIPTION OF THE DRAWINGS

An exemplary embodiment of the present disclosure will be described in detail based on the following figures, wherein:

FIG. 4 is an illustration for describing an example of a screen for receiving a condition for extraction of a message according to the exemplary embodiment of the present disclosure;

FIGS. 8A and 8B are illustrations for describing another example of a display presented by the display unit to present saved messages when "Messages exchanged with specified user" is selected in "Range of messages to be saved" according to the exemplary embodiment of the present disclosure;

FIGS. 9A and 9B are illustrations for describing another example of a display presented by the display unit to present saved messages when "Messages exchanged with specified user" is selected in "Range of messages to be saved" according to the exemplary embodiment of the present disclosure;

FIGS. 14A, 14B, 14C, and 14D are illustrations for describing another example of a display presented by the display unit when "Hide sender information" is selected in "Select information to be saved" according to the exemplary embodiment of the present disclosure;

DETAILED DESCRIPTION

Exemplary Embodiment

Figure 1:
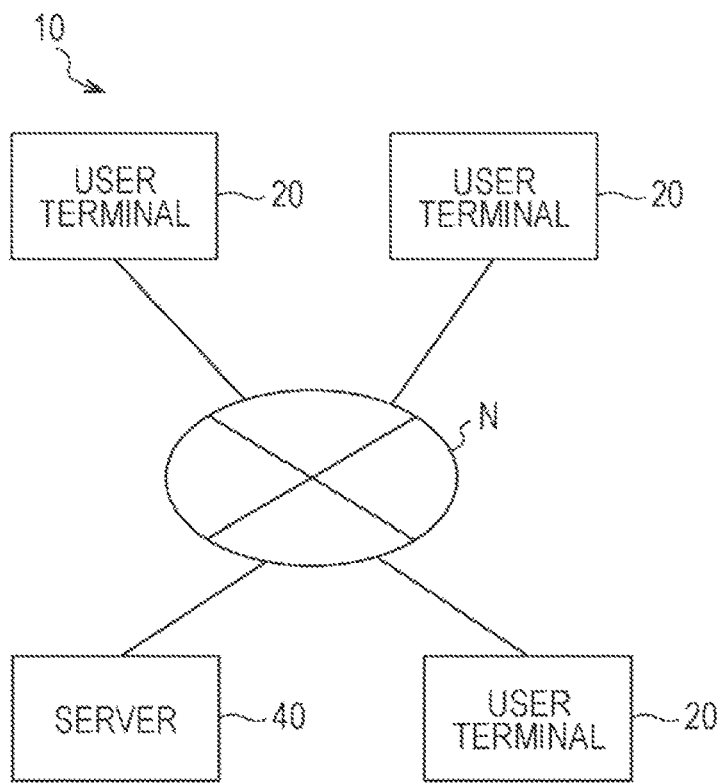
FIG. 1 is an illustration depicting a schematic configuration of an information processing system according to the exemplary embodiment of the present disclosure.

Hereinafter, an exemplary embodiment according to the present disclosure will be described with reference to the drawings. In the drawings, the same or equivalent components and parts are denoted by the same reference signs. The dimensions and proportions in the drawings are emphasized for the sake of description and are not necessarily drawn to scale.

An example of an information processing system 10 according to the present exemplary embodiment will be described with reference to FIG. 1.

FIG. 1 is an illustration depicting an example of a schematic configuration of the information processing system 10 according to the present exemplary embodiment.

As depicted in FIG. 1, the information processing system 10 according to the present exemplary embodiment includes one or more user terminals 20 such as a personal computer or a smartphone and a server 40. A user terminal 20 is a terminal used by a user and an example of an information processing apparatus. The server 40 is a server configured to provide a chat service in the present exemplary embodiment.

The one or more user terminals 20 and the server 40 are connected to each other by using a network N. Examples of the network N include the Internet, a local area network (LAN), and a wide area network (WAN).

The information processing system 10 in the present exemplary embodiment is configured to provide chat sessions between the user terminals 20 connected with each other via the server 40. A chat is a message exchanged in a chat room operated by the server 40, and one or more users can write to the chat room. A chat may include a character, a voice, and a moving image.

Figure 2:
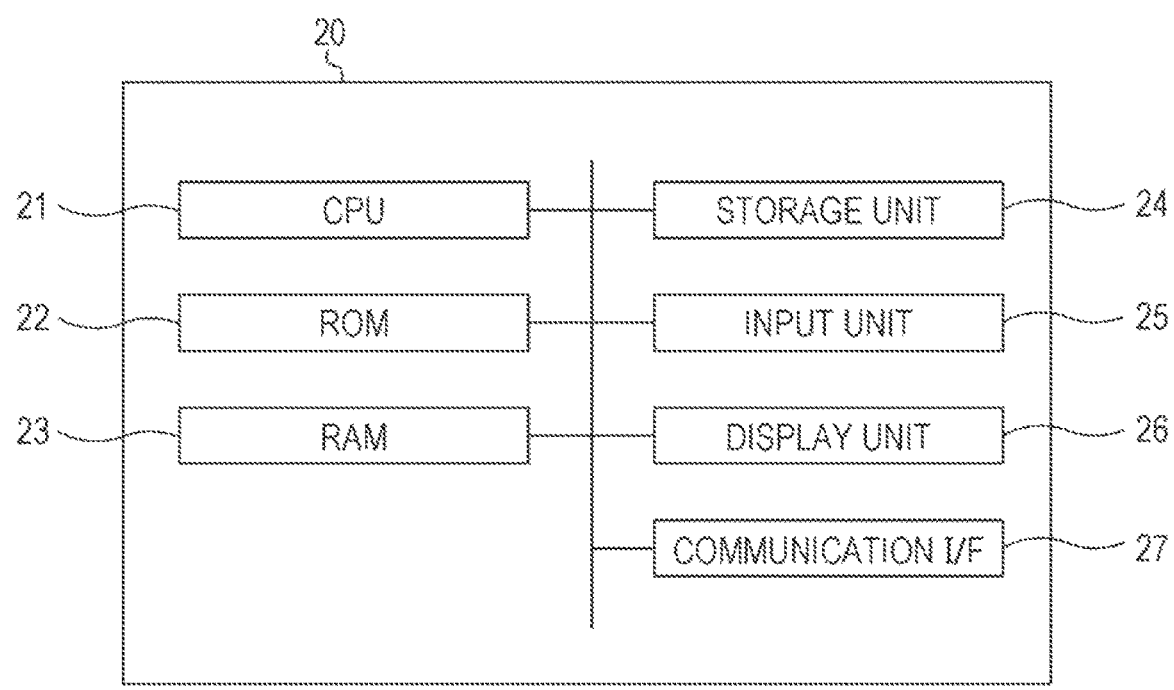
FIG. 2 is a schematic block diagram of a user terminal according to the exemplary embodiment of the present disclosure.

FIG. 2 is a block diagram depicting a hardware configuration of a user terminal 20 and the server 40 according to the present exemplary embodiment. A user terminal 20 and the server 40 basically have a configuration of a typical computer, and thus a user terminal 20 will be described as an example.

As depicted in FIG. 2, the user terminal 20 includes a central processing unit (CPU) 21, which is an example of a processor, a read-only memory (ROM) 22, a random-access memory (RAM) 23, a storage unit 24, an input unit 25, a display unit 26, and a communication interface (I/F) 27. These components are communicatively connected to each other by using a bus.

The CPU 21, which is a central computing processing unit, executes various programs and controls each component. Specifically, the CPU 21 loads programs from the ROM 22 or the storage unit 24 and uses the RAM 23 as a working space to execute the programs. The CPU 21 controls each component described above and performs various kinds of computing processing in accordance with the programs stored in the ROM 22 or the storage unit 24. In the present exemplary embodiment, the programs are stored in the ROM 22 or the storage unit 24.

The ROM 22 stores various programs and various kinds of data. The RAM 23 functions as a working space and temporarily retains programs or data. The storage unit 24 is formed by a storage device such as a solid state drive (SSD) or a flash memory and stores various programs including the operating system and various kinds of data.

In the present exemplary embodiment, the storage unit 24 is configured to store data containing one or more messages in a chat room and data containing one or more extracted messages described below. Data containing one or more messages is temporarily stored in the storage unit 24 in some cases. In addition to a message body, a message contains such information as the time that the message was sent, sender information that is information regarding the sender and that includes, for example, the username 200 of the sender, the username 200 of the recipient, an image 210 representing the user who sent the message, and attribute information 220 registered in advance and concerning the user who sent the message. The image 210 representing the user who sent the message is an image based on which the user can be identified or inferred, and examples of the image 210 include an icon representing the user, a photograph of the user, and an avatar. Examples of the attribute information 220, which is registered in advance and concerns the user who sent the message, include the name of a division to which the user belongs, the name of the title, the name of the group, the age, and the gender. In addition, the storage unit 24 is configured to store one or more application programs in the present exemplary embodiment.

The input unit 25 includes a pointing device, such as a mouse, and a keyboard and is used for receiving various kinds of input. The input unit 25 is used to receive such data as a message body and a condition for extraction of a message.

The display unit 26 is formed, for example, by a liquid crystal display. The display unit 26 is controlled by the CPU 21 and displays various kinds of information. The display unit 26 may include a touch panel system and may also function as the input unit 25.

The communication I/F 27 has a function of communicating with the server 40. The communication I/F 27 operates as a communication interface configured to transmit and receive various kinds of data to and from the server 40.

Data containing messages in a chat room and data for identifying attendees in the chat room are recorded in the storage unit of the server 40 by the administrator or users of the chat room. The data for identifying attendees includes the usernames 200, the images 210 representing users who sent messages, and the attribute information 220 registered in advance and concerning users who sent messages.

Next, an example of an operation of the information processing system 10 according to the present exemplary embodiment will be described.

Figure 3:
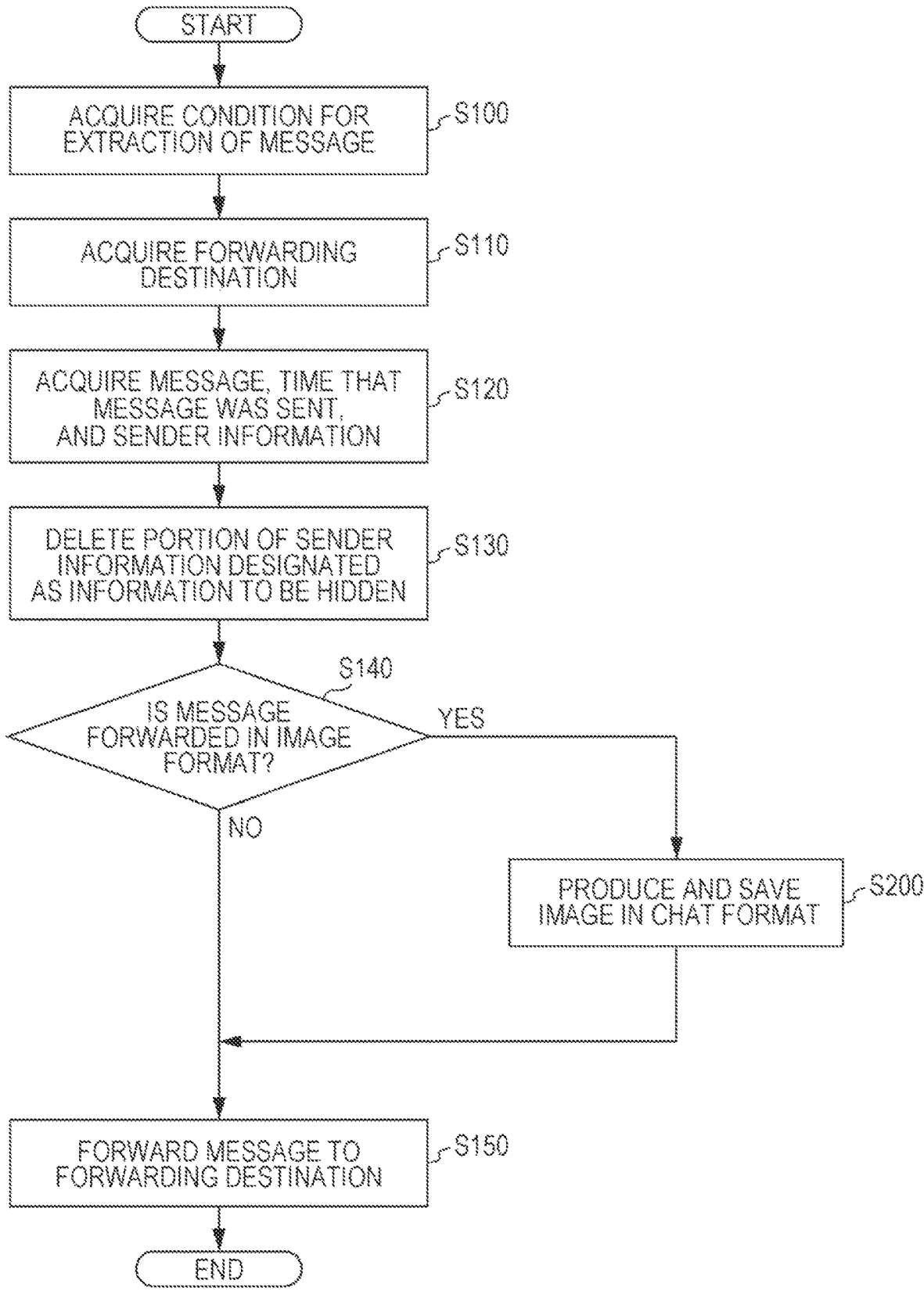
FIG. 3 is a flowchart depicting an example of an operation of the information processing system according to the exemplary embodiment of the present disclosure.

FIG. 3 is a flowchart depicting an example of a flow of processing performed by the user terminal 20 to forward a message in a chat room.

The CPU 21 of the user terminal 20 acquires a condition for extraction of a message in step S100 depicted in FIG. 3. A user enters the condition by using the input unit 25 of the user terminal 20. Then, the process proceeds to the next step, which is step S110. The condition for extraction of a message will be described below with reference to FIG. 4.

In step S110, the CPU 21 of the user terminal 20 acquires a forwarding destination entered by the user by using the input unit 25 of the user terminal 20. Examples of the entry of the forwarding destination by the user include selecting from a list such as a user list a user to whom a message is to be forwarded and searching for and selecting a name or an identifier (ID). Then, the process proceeds to the next step, which is step S120.

In step S120, the CPU 21 of the user terminal 20 acquires and temporarily retains a message extracted based on the condition for extraction acquired in step S100, the time that the message was sent, and the sender information of the message. Then, the process proceeds to the next step, which is step S130.

In step S130, the CPU 21 of the user terminal 20 deletes a portion of the sender information acquired in step S120. The portion is designated as sender information to be hidden based on the setting in a section "Select information to be saved" of the condition for extraction acquired in step S100. The section "Select information to be saved" will be described below with reference to FIG. 4. Then, the process proceeds to the next step, which is step S140.

Figure 5:
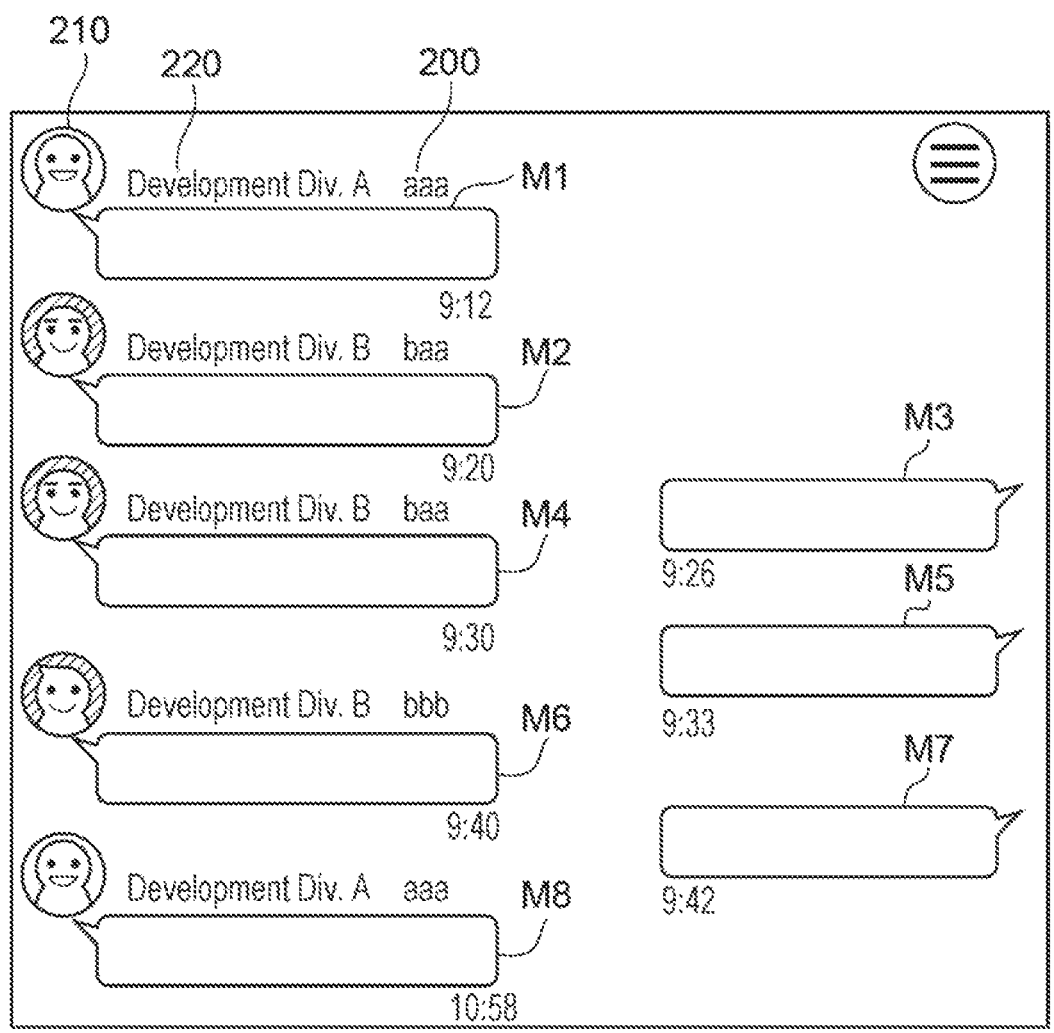
FIG. 5 is an illustration for describing an example of a display of a chat room according to the exemplary embodiment of the present disclosure.

In step S140, the CPU 21 of the user terminal 20 determines whether the item "Image format" has been selected in a section "Saving format" of the condition for extraction acquired in step S100. If it is not determined that the item "Image format" has been selected, that is, if it is determined that the item "Data format" has been selected, the extracted message is forwarded to the forwarding destination acquired in step S110 (step S150). The forwarded message is presented in a chat room so that the data containing the message is formatted in a chat-style layout. Specifically, in the chat-style layout such as is depicted in FIG. 5, which is similar to the layout in which messages in a chat room are presented, messages of the other users are disposed on the left-hand side, and messages of the user who forwards a message are disposed on the right-hand side. Messages are arranged in chronological order of the time that a message was sent. The section "Saving format" will be described below with reference to FIG. 4. Then, the process is terminated.

In contrast, if it is determined in step S140 described above that the "Image format" has been selected, the process proceeds to step S200, and an image in the chat format is produced from the extracted message and saved. Then, the process proceeds to step S150, which is described above. The data in the image format saved in step S140 may be deleted after being forwarded to the forwarding destination in step S150 or may be retained without being deleted.

Although a mode in which the user terminal 20 performs the processing of forwarding a message is described in FIG. 3 as a non-limiting example, the CPU of the server 40 may perform the processing of forwarding a message, or the processing of forwarding a message may be shared between both the CPUs of the user terminal 20 and the server 40.

Next, the condition for extraction of a message will be described.

FIG. 4 is an illustration for describing an example of a display presented by the display unit 26 of the user terminal 20 with regard to an input of the condition for extraction of a message. FIG. 5 is an illustration for describing an example of a display of messages in a chat room. As depicted in FIG. 5, a chat room can present the usernames 200 of users who sent messages, the images 210 representing users who sent messages, and the attribute information 220 registered in advance and concerning users who sent messages. The attribute information 220 represents the name of a division to which each user belongs in this example. Messages of the other users are presented on the left-hand side of the chat room, and messages of the user who extracts a message and thereafter saves or forwards the message, that is, messages of the user of the user terminal 20 that presents the chat room depicted in FIG. 5 are presented on the right-hand of the chat room. In the present example, the username 200 of the user who extracts a message and thereafter saves or forwards the message, the image 210 representing the user, and the attribute information 220 concerning the user are not presented on the right-hand side of the chat room. The username 200 of the user who extracts a message and thereafter saves or forwards the message, the image 210 representing the user, and the attribute information 220 concerning the user may be presented, or the user may be allowed to configure the setting with regard to whether such information is presented.

As depicted in FIG. 4, the condition for extraction of a message includes sections denoted by "Range of messages to be saved", "Saving format", and "Select information to be saved". An extracted message is saved if the user selects saving and is forwarded after saving if the user selects forwarding. Such saving performed before forwarding is temporary in some cases.

The section "Range of messages to be saved" is used to specify the range of messages to be saved. For example, as depicted in FIG. 4, the section includes items "Messages being presented", "Specify time period during which message was sent", "Specify first and last messages", and "Messages exchanged with specified user".

At least one message being presented by the display unit 26 is saved by selecting the item "Messages being presented". For example, when the messages are presented as depicted in FIG. 5, the messages M1 to M8 are saved.

Figure 6:
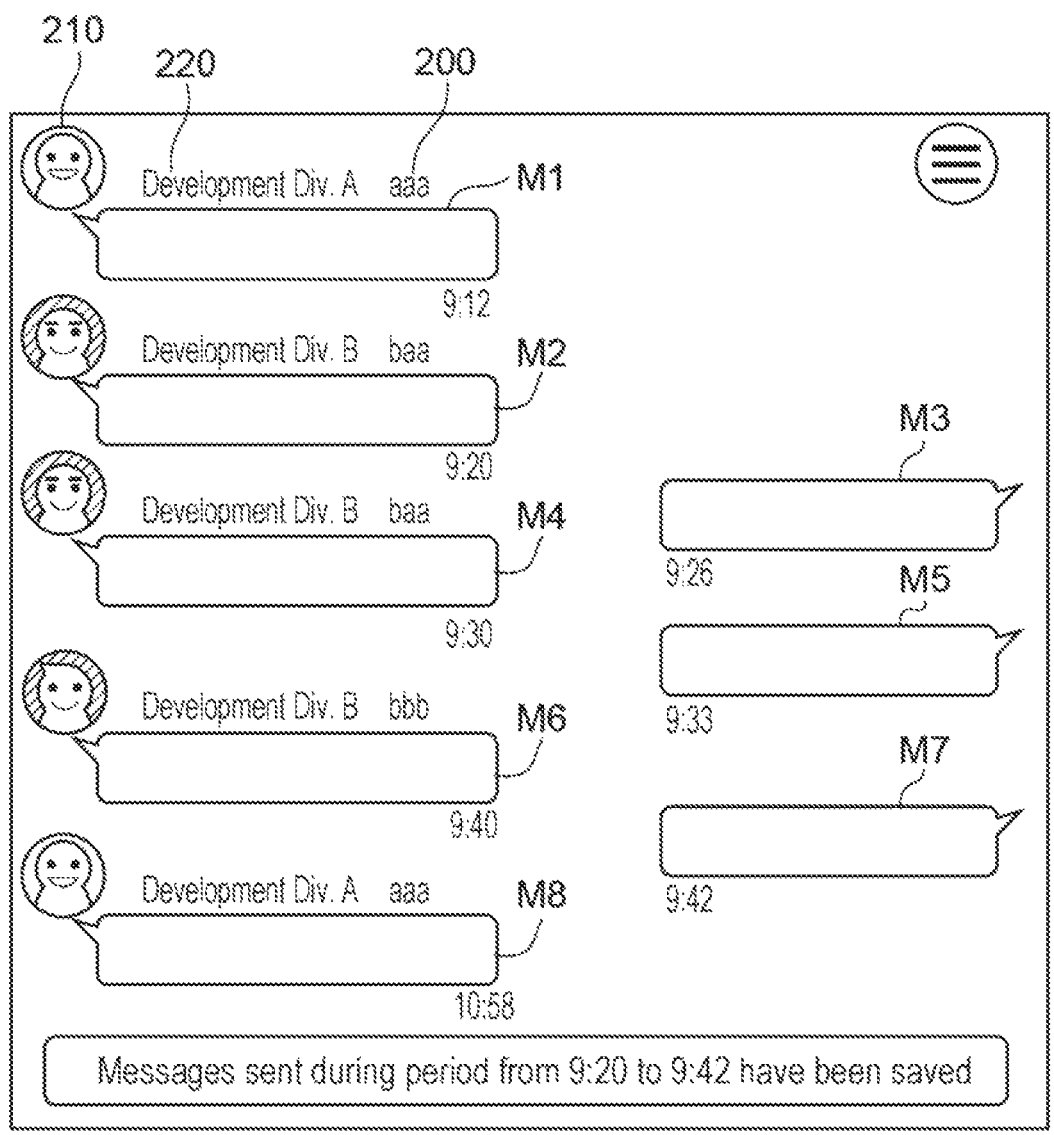
FIG. 6 is an illustration for describing an example of a display presented by a display unit to report that messages have been saved according to the exemplary embodiment of the present disclosure.

Of the messages, messages sent during a specified time period are saved by selecting the item "Specify time period during which message was sent". For example, if a time period is specified as "09:20, 08/01/2021 to 09:45, 08/01/2021", the messages M2 to M7 are saved in the example in FIG. 5. When the messages are saved, a display such as "Messages sent during period from 9:20 to 9:42 have been saved" is presented in the chat room as depicted in FIG. 6, reporting to the other users in the chat room that the messages have been saved. A display reporting that the messages have been saved is not limited to the character string that includes the condition for extraction of a message as depicted in FIG. 6. For example, the condition for extraction of a message may be omitted. If omitted, the condition for extraction of a message may be presented when the user double-clicks with a device such as a mouse or touches with a finger the display reporting that the messages have been saved.

The setting "Specify first and last messages" is used to specify the first and last of the messages and save the messages sent between the first message and the last message together with the first and last messages. For example, in the example in FIG. 5, if the message M2 is designated as the first message and the message M5 is designated as the last message, the messages M2 to M5 are saved.

Figure 7A:
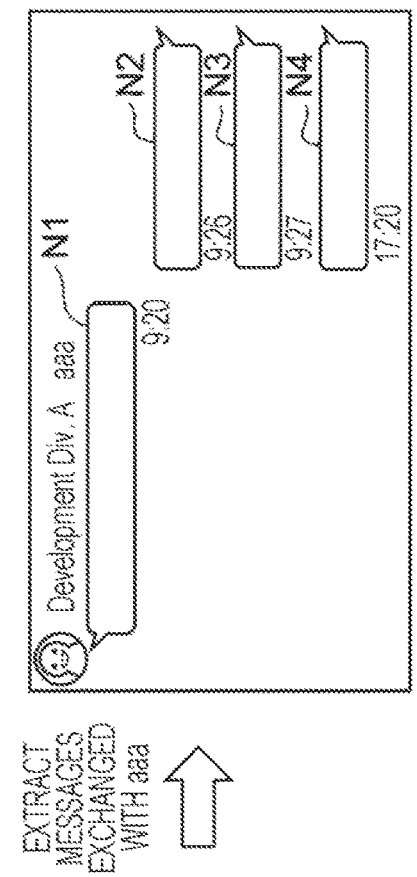
FIGS. 7A and 7B are illustrations for describing an example of a display presented by the display unit to present saved messages when "Messages exchanged with specified user" is selected in "Range of messages to be saved" according to the exemplary embodiment of the present disclosure.
Figure 7B:
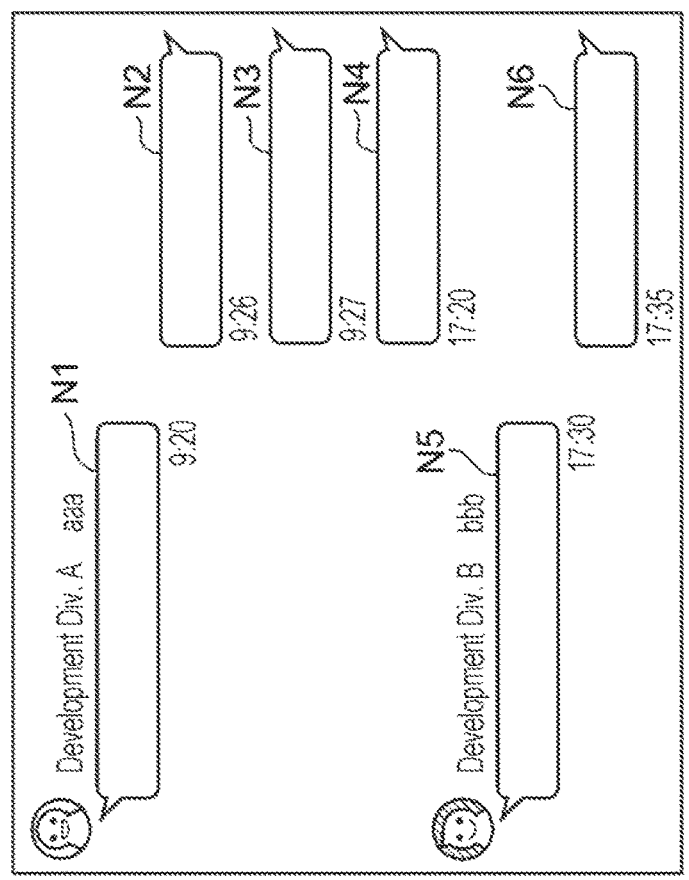

The setting "Messages exchanged with specified user" is used to specify a user in the chat room with whom messages to be extracted are exchanged. For example, if a user having a username 200 "aaa" is designated as the specified user, a first message sent by the user "aaa" and a following message that was sent after the first message by the user of the user terminal 20 are saved. Specifically, all the messages exchanged after the specified user sent the first message and before a user other than the specified user thereafter sent a message are extracted and saved. More specifically, if a chat room contains such messages as are depicted in FIG. 7A, messages N1 to N4 are extracted and saved as depicted in FIG. 7B. The messages N1 to N4 correspond to all the messages exchanged after the message N1, which was sent by the specified user "aaa", and before a user (a user "bbb" in this example) other than the specified user "aaa" sent a message N5.

The setting "Messages exchanged with specified user" does not necessarily require that all the messages exchanged after the specified user sent the first message and before a user other than the specified user thereafter sent a message be extracted as depicted in FIG. 7B. For example, at least one message exchanged within a predetermined period after the specified user sent the first message may be extracted from one or more messages exchanged after the specified user sent the first message and before a user other than the specified user thereafter sent a message. Specifically, as depicted in FIGS. 8A and 8B, messages N1 to N3 may be extracted and saved. The messages N1 to N3 are exchanged within a predetermined period, for example, one hour, after the specified user "aaa" sent the first message. Further, of the messages exchanged after the specified user sent the first message and before a user other than the specified user thereafter sent a message, the message exchanged earliest with the specified user may be extracted. Specifically, as depicted in FIGS. 9A and 9B, messages N1 and N2 may be extracted and saved. The messages N1 and N2 are the messages exchanged earliest with the specified user "aaa", that is, the message received earliest from the user "aaa", and the message sent earliest by the user of the user terminal 20 in response to the message received earliest from the user "aaa".

Figure 10A:
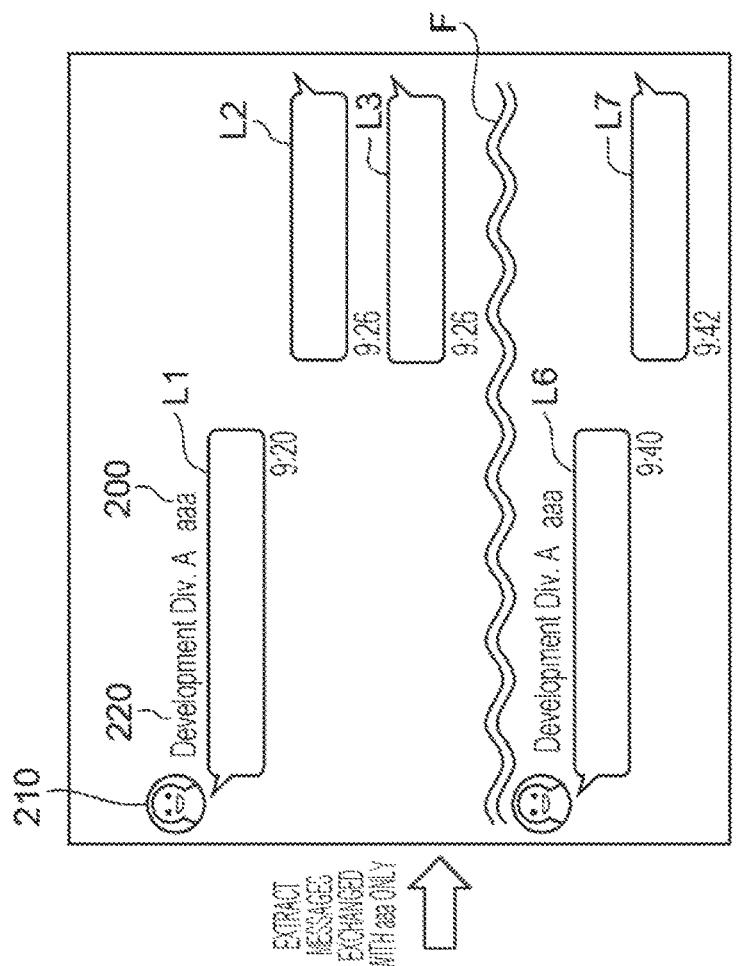
FIGS. 10A and 10B are illustrations for describing another example of a display presented by the display unit to present saved messages when "Messages exchanged with specified user" is selected in "Range of messages to be saved" according to the exemplary embodiment of the present disclosure.
Figure 10B:
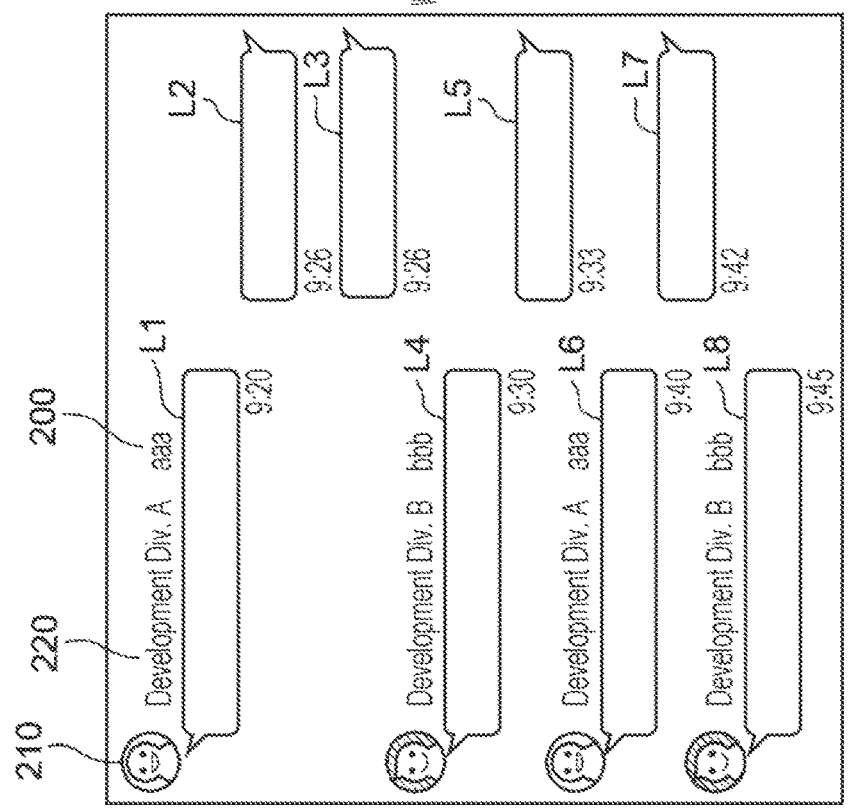

If extraction of at least one message reveals that a user other than the specified user sent a message between multiple messages sent by the specified user, the at least one extracted message may be stored or forwarded to another chat room in such a manner that a fact that the user other than the specified user sent a message is recognizable. For example, if the chat room contains messages exchanged with a user "bbb" other than the specified user "aaa" between messages exchanged with the specified user "aaa" as depicted in FIG. 10A, an omission mark F formed by wavy lines are inserted between extracted messages exchanged with the specified user "aaa" as depicted in FIG. 10B so as to indicate that a user other than the specified user sent one or more messages. Specifically, in the example depicted in FIGS. 10A and 10B, messages L4 and L5 exchanged with the user "bbb" other than the specified user "aaa" between extracted messages L1 to L3 and extracted messages L6 and L7 are not extracted. Thus, the omission mark F formed by wavy lines are inserted between the message L3 and the message L6 to indicate that the messages L4 and L5 exchanged with the user "bbb" other than the specified user "aaa" are not extracted. The omission mark F formed by such wavy lines as are depicted in FIG. 10B is a non-limiting example. Other marks may be used or a string such as "Messages exchanged with other users have been omitted" may be presented to indicate that a user other than the specified user sent a message.

Multiple requirements may be specified in a condition for extraction of a message. In particular, specifying both the settings "Specify time period during which message was sent" and "Messages exchanged with specified user" enables messages exchanged with a specified user during a specified period of sending to be extracted. Extracting messages by specifying both the settings is more helpful than extracting all the messages exchanged with the specified user irrespective of the time that a message was sent.

Figures 11, 12:
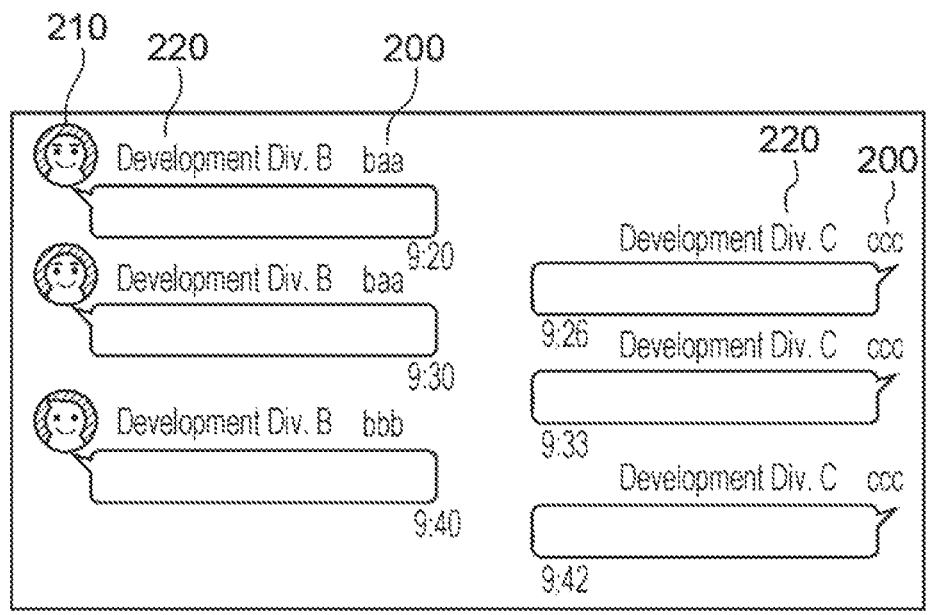
FIG. 11 is an illustration for describing an example of a mode in which messages are saved in "Image format" according to the exemplary embodiment of the present disclosure.
FIG. 12 is an illustration for describing an example of a mode in which messages are saved in "Data format" according to the exemplary embodiment of the present disclosure.

The section "Saving format" is used to select whether an extracted message is saved or forwarded in a "Data format" or in an "Image format". The "Data format" allows the message to be searched for and edited, and the "Image format" does not allow the message to be searched for or edited. For example, if the "Image format" is selected, messages are saved as an image as depicted in FIG. 11. If the "Data format" is selected, messages are saved as depicted in FIG. 12. If the "Data format" is selected, a message identifier (ID) is attached to each message, and the sender ID, which is assigned in advance to the user who sent the message, the date and time that the message was sent, and the body of the message are recorded as depicted in FIG. 12. If the "Data format" is selected, when a message is forwarded, the data containing the message is formatted in a chat-style layout and presented in a chat room. The chat-style layout is similar to the layout in which data containing a message is presented when the "Image format" is selected. The layout adopted when the "Data format" is selected is not limited to the chat-style layout similar to the layout in which data containing a message is presented in a chat room when the "Image format" is selected. For example, a layout of a table such as is depicted in FIG. 12 may be adopted for presentation.

Whether to adopt the "Data format" or the "Image format" may be determined in the initial setting in accordance with a data volume or presence or absence of an attached file. For example, if at least one extracted message is larger in volume than a predetermined volume, the at least one extracted message may be saved or forwarded in the "Data format", and if at least one extracted message is equal to or smaller in volume than the predetermined volume, the at least one extracted message may be saved or forwarded in the "Image format". At least one extracted message is larger in volume than the predetermined volume, for example, if the number of the at least one extracted message is larger than a predetermined number, the at least one extracted message has a data volume larger than a predetermined volume, or the number of characters in the at least one extracted message is larger than a predetermined number of characters. Whether to adopt the "Data format" or the "Image format" may be determined in the initial setting in accordance with presence or absence of a file attached to a message.

The section "Select information to be saved" is used to select information to be saved from the information included in an extracted message, that is, used to save the information included in the extracted message after removing information not to be included. For example, the settings "Everything" and "Hide sender information" are available as depicted in FIG. 4. As described above, sender information includes, for example, the username 200 of the sender, the username 200 of the recipient, the image 210 representing the user who sent the message, and the attribute information 220 registered in advance and concerning the user who sent the message.

In the setting "Everything", no sender information is hidden, and all the sender information is saved. Specifically, no sender information presented in a chat room is hidden, and all the sender information in the chat room is saved in this setting.

In the setting "Hide sender information", when a message is extracted and saved, information regarding the sender of the message is hidden. For example, two options "Hide everything" and "Present division name only" are available in the setting "Hide sender information".

Figure 13A:
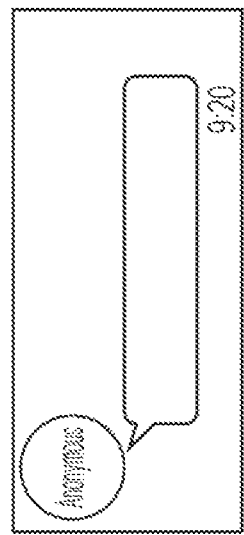
FIGS. 13A and 13B are illustrations for describing an example of a display presented by the display unit when "Hide sender information" is selected in "Select information to be saved" according to the exemplary embodiment of the present disclosure.
Figure 13B:
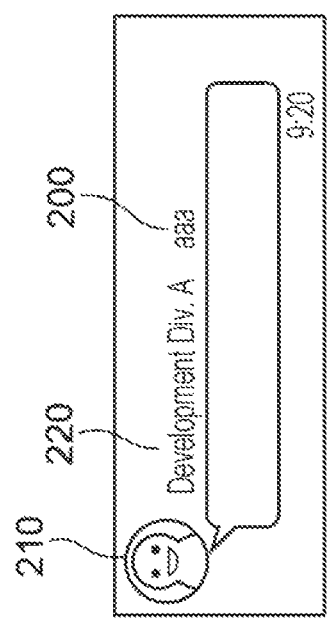

In the setting "Hide everything", information regarding the sender of the message is all hidden when the message is saved. Examples of the information regarding the sender include the username 200, the image 210 representing the user who sent the message, and the attribute information 220. Specifically, when a message is extracted as depicted in FIG. 13A, the message is saved as depicted in FIG. 13B in this setting. The username 200, the image 210 representing the user who sent the message, and the attribute information 220 in the sender information are all presented in the message depicted in FIG. 13A. In this setting, information except the username 200, the image 210 representing the user who sent the message, and the attribute information 220 in the sender information is saved as depicted in FIG. 13B. The image 210 representing the user who sent the message may not only be removed from the extracted message for saving but also be replaced with another image (an image presenting a string "Anonymous", indicating that the name is not disclosed in this example) so as not to be included in the extracted message. The message is saved as depicted in FIG. 13B.

In the setting "Present division name only", only the name of a division to which the sender belongs, which is an example of the attribute information 220, in the information regarding the sender of the message is unhidden and saved, and the other information, such as the username 200 and the image 210 representing the user who sent the message, is not saved. Specifically, when a message is extracted as depicted in FIG. 14A, the message is saved as depicted in FIG. 14B in this setting. The username 200, the image 210 representing the user who sent the message, and the attribute information 220 are all presented in the message depicted in FIG. 14A. In this setting, only the name of a division "Development Div. A" to which the user belongs, which is an example of the attribute information 220, is presented and saved as depicted in FIG. 14B. The username 200 and the image 210 representing the user who sent the message are not saved. In the setting in which the username 200 and the image 210 representing the user who sent the message are not saved, the sender information except the name of the division, which is to be presented, may be replaced with other information and saved as depicted in FIG. 14C. For example, the image 210 may be replaced with another image and saved, or the username 200 may be replaced with "anonym A" and saved. The setting for not saving a portion of the sender information is not limited to the setting "Present division name only". For example, a setting "Present division name and image" for not presenting only the username 200 may be adopted as depicted in FIG. 14D.

Figure 15A:
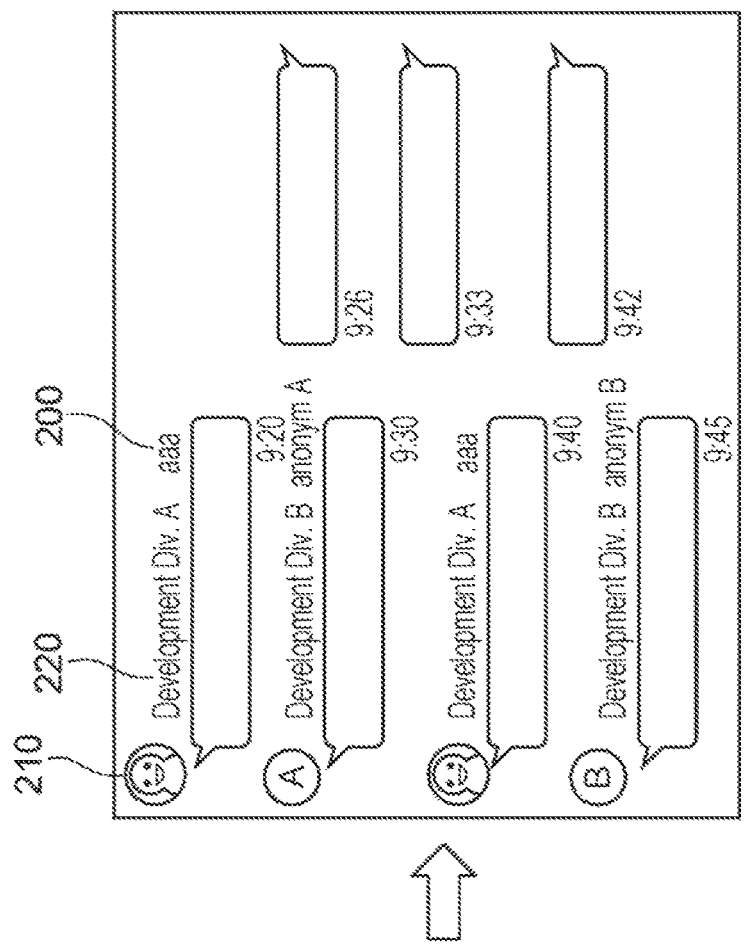
FIGS. 15A and 15B are illustrations for describing another example of a display presented by the display unit when "Hide sender information" is selected in "Select information to be saved" according to the exemplary embodiment of the present disclosure.
Figure 15B:
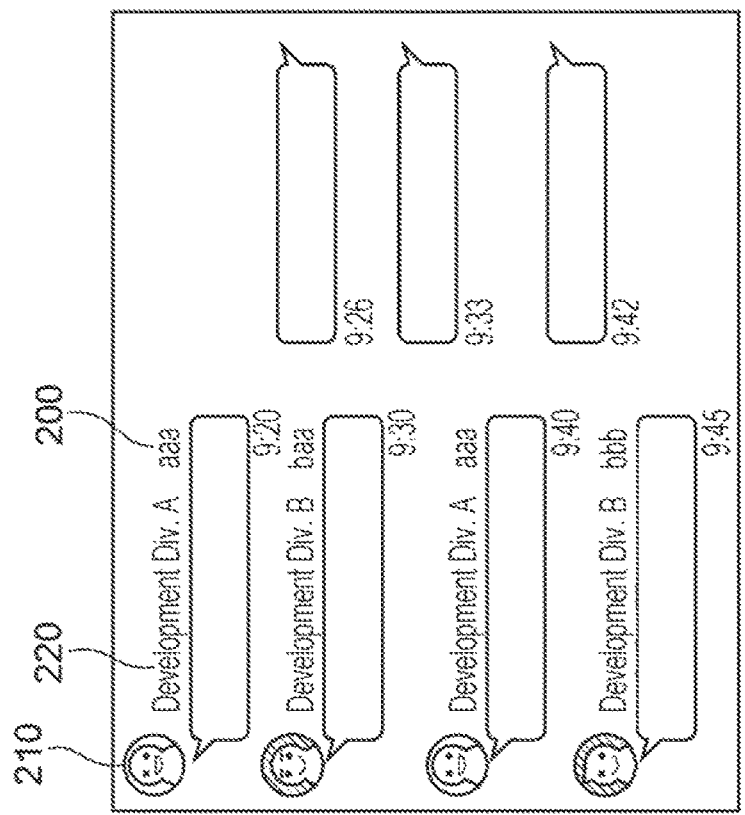

The setting "Hide sender information" need not be applied to every user who exchanged messages to be extracted, and sender information regarding some specified users may be hidden by the setting. Specifically, if messages depicted in FIG. 15A are in the range of messages to be saved and only the user "aaa" is to be presented, the usernames 200 and the images 210 representing the users "baa" and "bbb" other than the user "aaa" are not saved as depicted in FIG. 15B. Instead of specifying one or more users to be presented, one or more users to be hidden may be specified. Specifically, the users "baa" and "bbb", who are to be hidden, may be specified in the example in FIGS. 15A and 15B.

As described above, the username 200, the image 210 representing a user, and the attribute information 220 of a user who provides instructions to extract a message and thereafter save or forward the message, that is, a user presented on the right-hand side of a chat room are not presented in the chat room because such information concerns the person using the user terminal 20 and is less required to be presented in the chat room. However, at least one of the username 200, the image 210 representing the user, and the attribute information 220 of the user who saves or forwards an extracted message may be attached to the extracted message. Specifically, as depicted in FIG. 11, "Development Div. C" as the attribute information 220 and "ccc" as the username 200 may be presented. When a message that has been saved or a message that has been forwarded are viewed, the user who has provided the instructions to extract the message is sometimes unclear. Thus, attaching information regarding the user who has provided the instructions makes the sender of the message easily identifiable.

Figure 16:
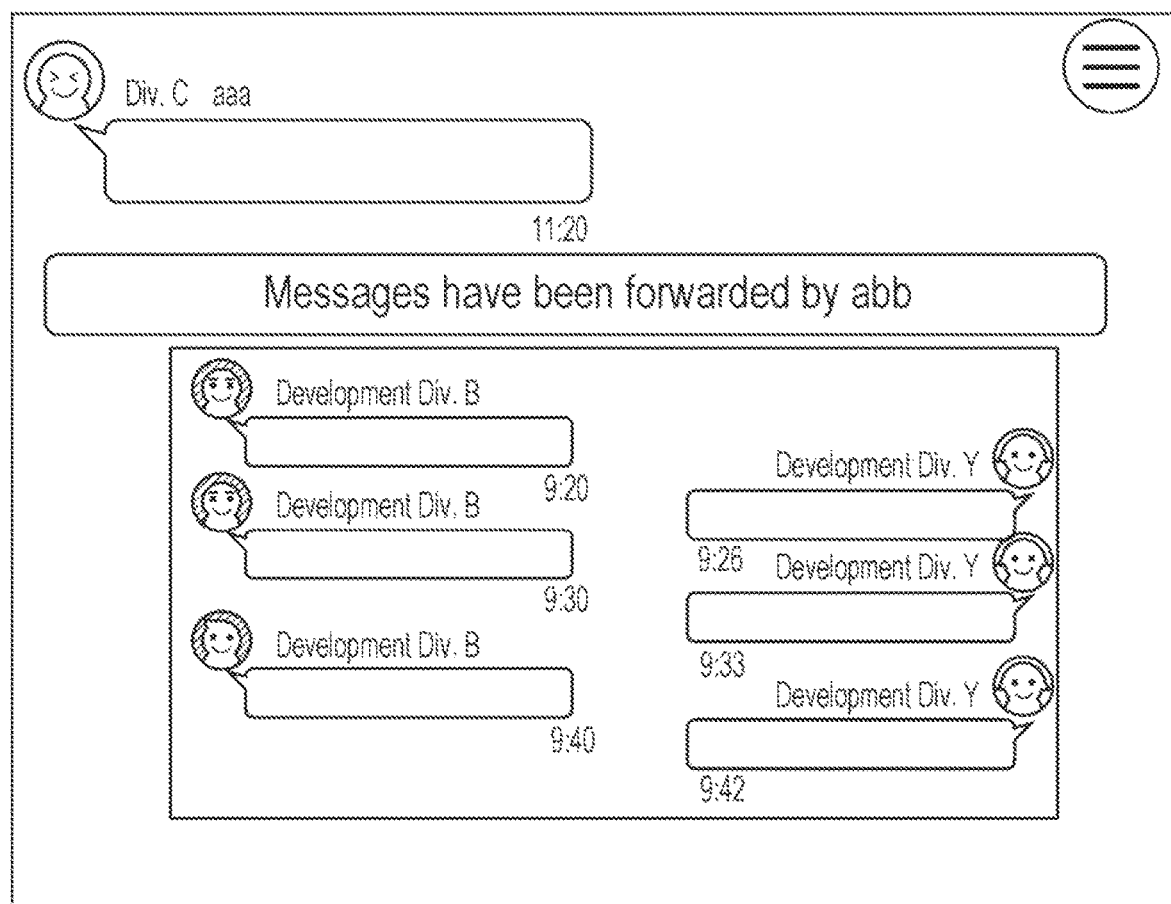
FIG. 16 is an illustration for describing an example of a display presented by the display unit when messages are forwarded according to the exemplary embodiment of the present disclosure.

When messages are forwarded, the forwarded messages are presented under a notification such as "Messages have been forwarded by abb" in a chat room as depicted in FIG. 16.

The present disclosure is not limited to the exemplary embodiment described above, and various modifications and applications are possible as long as they do not depart from the spirit of the disclosure.

For example, the settings of a chat room may prohibit a message from being saved or forwarded or prohibit an attached file from being forwarded.

In the above exemplary embodiment, a mode in which the program is stored (installed) in the ROM or in the storage unit in advance has been described by way of non-limiting example. The program may be stored in a recording medium and provided. Examples of the recording medium include a compact disc read-only memory (CD-ROM), a digital versatile disc read-only memory (DVD-ROM) and a universal serial bus (USB) memory. Alternatively, the program may be downloaded from an external apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program causing a computer to execute a process, the process comprising:
    extracting at least one message that satisfies a condition specified by a user from one or more messages in a chat room to which one or more users are allowed to write, wherein the condition includes a range of messages to be extracted, the range being set by the user to be a particular time period, the extracting including extracting only messages sent within the particular time period, and not messages sent outside of the particular time period;
    saving the at least one extracted message or forwarding the at least one extracted message to another chat room; and
    displaying, to other users in the chat room, messages that are saved or forwarded and the condition specified by the user under which the messages are saved or forwarded.

2. The non-transitory computer readable medium storing the program according to claim 1,
    wherein, when the at least one message is extracted, the program is configured to enable modification of predetermined information concerning the at least one message.

3. The non-transitory computer readable medium storing the program according to claim 2,
    wherein the program is configured to:
        enable presentation of a username of a user who sent a message in the chat room; and
        modify the predetermined information so that each of the at least one extracted message does not contain a username of a user who sent the extracted message.

4. The non-transitory computer readable medium storing the program according to claim 2,
    wherein the program is configured to:
        enable presentation of an image representing a user who sent a message in the chat room; and
        modify the predetermined information so that each of the at least one extracted message does not contain an image representing a user who sent the extracted message.

5. The non-transitory computer readable medium storing the program according to claim 3,
    wherein the program is configured to:
        enable presentation of an image representing a user who sent a message in the chat room; and
        modify the predetermined information so that each of the at least one extracted message does not contain an image representing a user who sent the extracted message.

6. The non-transitory computer readable medium storing the program according to claim 2,
    wherein the program is configured to:
        enable presentation of attribute information registered in advance and concerning a user who sent a message in the chat room; and
        modify the predetermined information so that each of the at least one extracted message does not contain attribute information registered in advance and concerning a user who sent the extracted message.

7. The non-transitory computer readable medium storing the program according to claim 3,
    wherein the program is configured to:
        enable presentation of attribute information registered in advance and concerning a user who sent a message in the chat room; and
        modify the predetermined information so that each of the at least one extracted message does not contain attribute information registered in advance and concerning a user who sent the extracted message.

8. The non-transitory computer readable medium storing the program according to claim 4,
    wherein the program is configured to:
        enable presentation of attribute information registered in advance and concerning a user who sent a message in the chat room; and
        modify the predetermined information so that each of the at least one extracted message does not contain attribute information registered in advance and concerning a user who sent the extracted message.

9. The non-transitory computer readable medium storing the program according to claim 5,
    wherein the program is configured to:
        enable presentation of attribute information registered in advance and concerning a user who sent a message in the chat room; and
        modify the predetermined information so that each of the at least one extracted message does not contain attribute information registered in advance and concerning a user who sent the extracted message.

10. The non-transitory computer readable medium storing the program according to claim 2,
    wherein the program is configured to:
        present in the chat room neither a username of a user in the chat room, an image representing the user, nor attribute information registered in advance and concerning the user; and
        attach to each of the at least one extracted message at least one of a username, an image, and attribute information, and
    wherein the username and the image represent a user who saves or forwards the extracted message and the attribute information concerns the user who saves or forwards the extracted message.

11. The non-transitory computer readable medium storing the program according to claim 3,
    wherein the program is configured to:
    present in the chat room neither a username of a user in the chat room, an image representing the user, nor attribute information registered in advance and concerning the user, and
    attach to each of the at least one extracted message at least one of a username, an image, and attribute information, and
    wherein the username and the image represent a user who saves or forwards the extracted message and the attribute information concerns the user who saves or forwards the extracted message.

12. The non-transitory computer readable medium storing the program according to claim 1,
wherein the condition for extraction of the at least one message includes specifying a user to be extracted in the chat room.

13. The non-transitory computer readable medium storing the program according to claim 12,
wherein, when the at least one message is extracted,
the program is configured to extract all of at least one message exchanged after the specified user sent a message and before a user other than the specified user thereafter sent a message.

14. The non-transitory computer readable medium storing the program according to claim 12,
wherein, when the at least one message is extracted,
the program is configured to extract a message exchanged within a predetermined period after the specified user sent a message from one or more messages exchanged after the specified user sent the message and before a user other than the specified user thereafter sent a message.

15. The non-transitory computer readable medium storing the program according to claim 12,
wherein, when the at least one message is extracted,
the program is configured to extract a message exchanged earliest with the specified user from one or more messages exchanged after the specified user sent a message and before a user other than the specified user thereafter sent a message.

16. The non-transitory computer readable medium storing the program according to claim 12,
wherein, if extraction of the at least one message reveals that a user other than the specified user sent a message between a plurality of messages sent by the specified user, the program is configured to store or forward to another chat room the at least one extracted message in such a manner that a fact that the user other than the specified user sent a message is recognizable.

17. The non-transitory computer readable medium storing the program according to claim 1,
wherein, when the at least one message is extracted,
the program is configured to enable a user to select whether each of the at least one extracted message is saved or forwarded in a data format that allows editing or in an image format that does not allow editing.

18. The non-transitory computer readable medium storing the program according to claim 1,
wherein, when the at least one message is extracted,
the program is configured to save or forward the at least one extracted message in a data format that allows editing if the at least one extracted message has a data volume larger than a predetermined volume and save or forward the at least one extracted message in an image format that does not allow editing if the at least one extracted message has a data volume equal to or smaller than the predetermined volume.

19. An information processing apparatus comprising:
a processor configured to:
extract at least one message that satisfies a condition specified by a user from one or more messages in a chat room to which one or more users are allowed to write, wherein the condition includes a range of messages to be extracted, the range being set by the user to be a particular time period, the extracting including extracting only messages sent within the particular time period, and not messages sent outside of the particular time period;
save the at least one extracted message or forward the at least one extracted message to another chat room; and
display, to other users in the chat room, messages that are saved or forwarded and the condition specified by the user under which the messages are saved or forwarded.

20. An information processing method comprising:
extracting at least one message that satisfies a condition specified by a user from one or more messages in a chat room to which one or more users are allowed to write, wherein the condition includes a range of messages to be extracted, the range being set by the user to be a particular time period, the extracting including extracting only messages sent within the particular time period, and not messages sent outside of the particular time period;
saving the at least one extracted message or forwarding the at least one extracted message to another chat room; and
displaying, to other users in the chat room, messages that are saved or forwarded and the condition specified by the user under which the messages are saved or forwarded.

* * * * *